I. M. THURLOW.
INTERMITTENT GRIP DEVICE.
APPLICATION FILED SEPT. 26, 1910.
1,097,571.
Patented May 19, 1914.
3 SHEETS—SHEET 3.
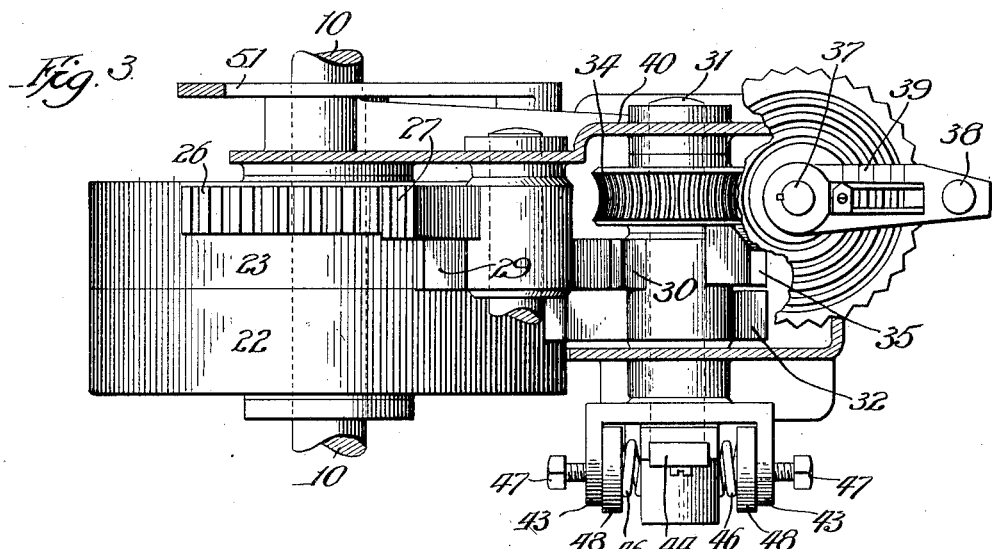
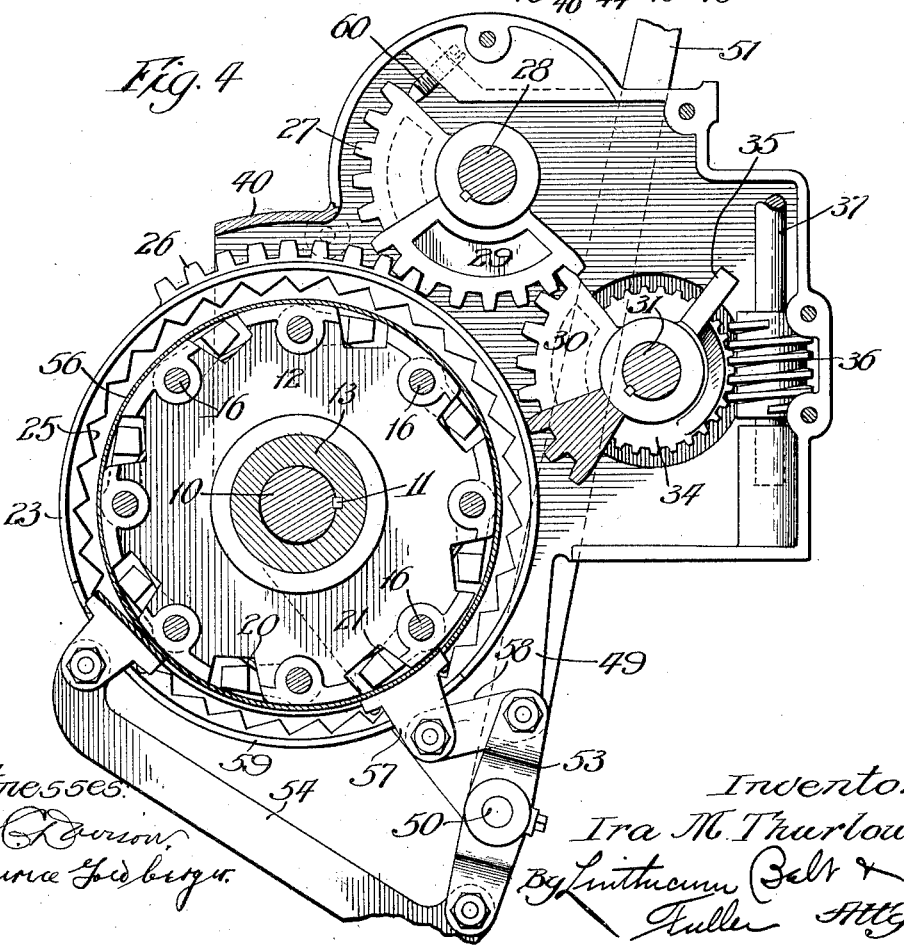

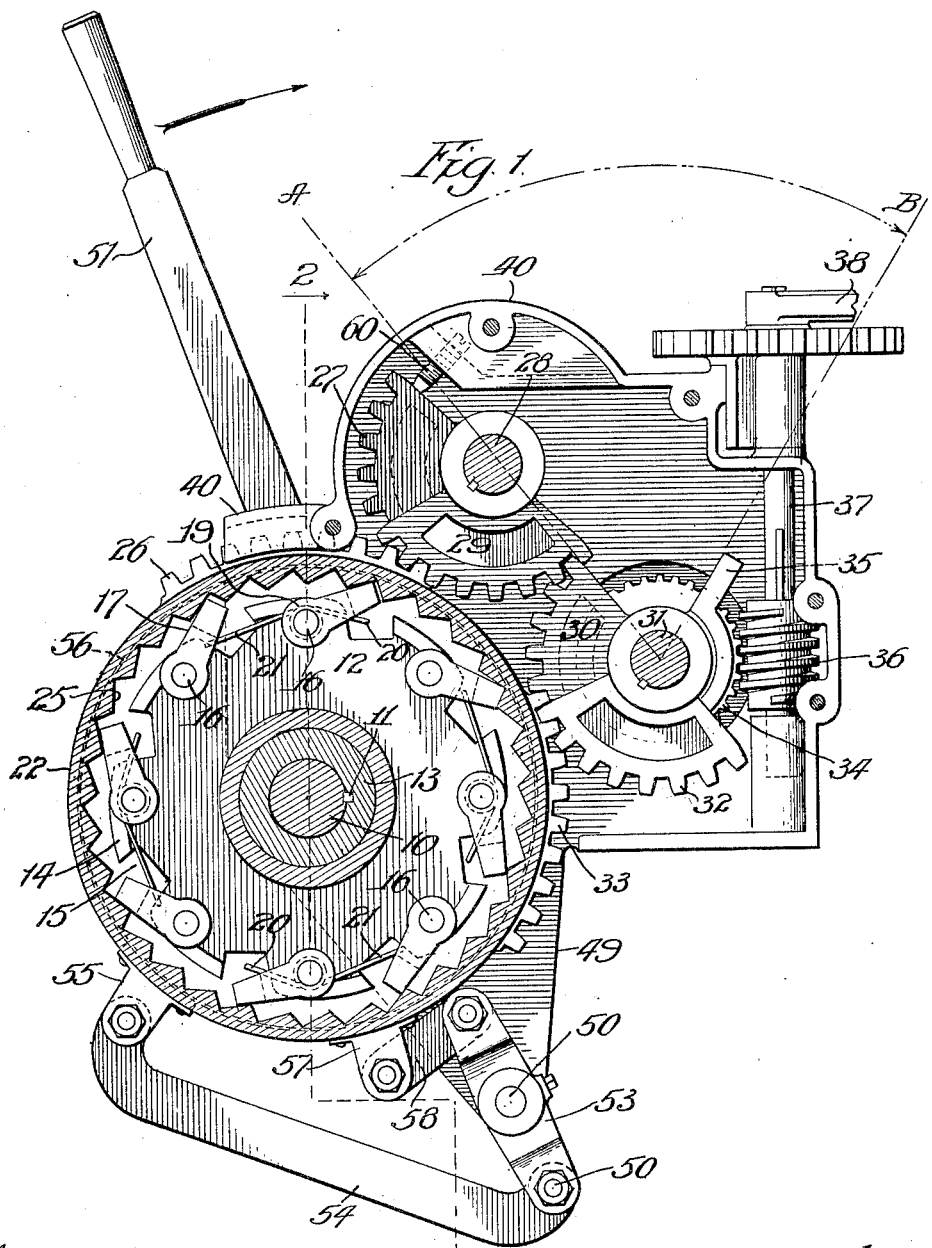

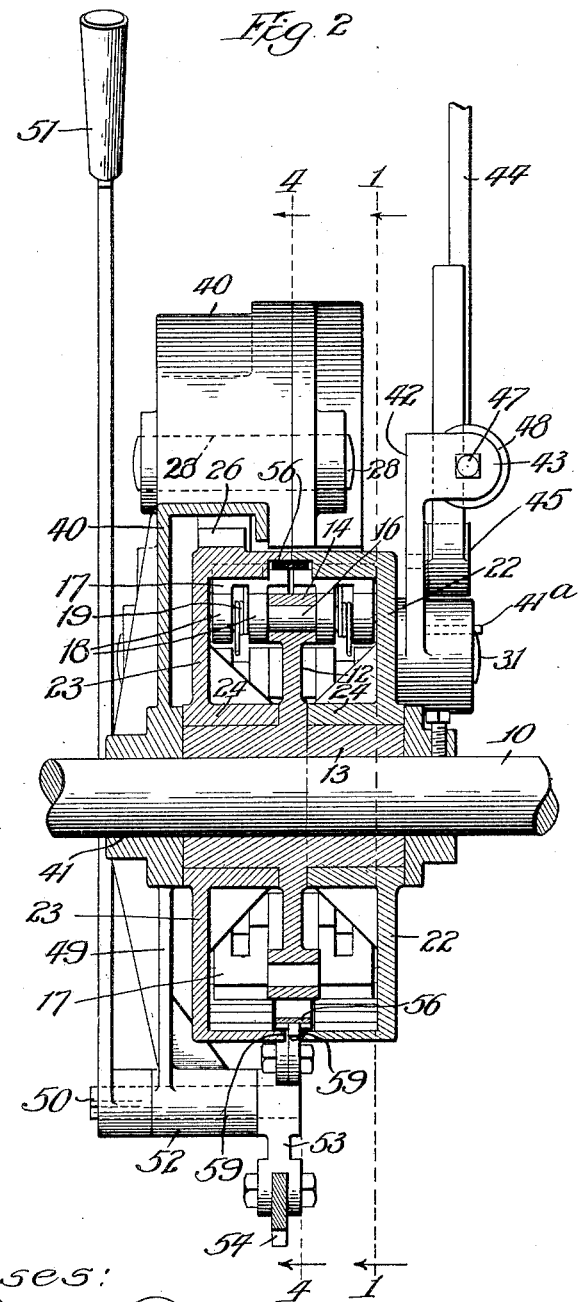

UNITED STATES PATENT OFFICE.

IRA M. THURLOW, OF BELOIT, WISCONSIN, ASSIGNOR TO THE BERLIN MACHINE WORKS, OF BELOIT, WISCONSIN, A CORPORATION OF WISCONSIN.

INTERMITTENT-GRIP DEVICE.

1,097,571.  Specification of Letters Patent.  Patented May 19, 1914.

Application filed September 26, 1910. Serial No. 583,727.

*To all whom it may concern:*

Be it known that I, IRA M. THURLOW, a citizen of the United States, residing at Beloit, in the county of Rock and State of Wisconsin, have invented certain new and useful Improvements in Intermittent-Grip Devices, of which the following is a specification.

My invention pertains to set works for saw mills of the double acting type, one of the salient features being the provision of means permitting the rapid retraction of the knees and a sudden stopping of such parts by brake means when they reach their rearward limit of travel. This result, with others, is readily accomplished by constructions embodying the present invention, one of such structures, a preferred form, being illustrated in detail in the accompanying drawings which form a part of this specification and throughout the various views of which like reference characters refer to the same parts.

In these drawings; Figure 1 is a vertical section on the line 1—1 of Fig. 2 through this embodiment of the invention, some of the parts being broken away to more clearly show the construction. Fig. 2 is a vertical section at right angles to that of Fig. 1, on the line 2—2 of Fig. 1, and is taken through the set shaft; Fig. 3 is a fragmentary plan view of the device, and Fig. 4 is a view similar to Fig. 1, showing the dogs or pawls retracted and the brake in operation, this section being taken on the line 4—4 of Fig. 1.

By reference to these drawings it will be apparent that the set shaft 10 has fixed thereto by a key 11, a disk 12, having a hub 13 of substantial length, as is indicated in Fig. 2. The disk around its periphery is somewhat thickened or widened at 14 and is cut away so as to provide a plurality of notches or cavities 15 around its cylindrical outer surface. Extended through these thickened parts 14 and projecting from the opposite faces of the disk a substantial distance, I employ a plurality of shafts or rods 16, eight of which are used in the present instance, although the exact number employed is not material. On each side of the disk 12 on each of the projecting rods 16, I pivot or fulcrum a pawl or dog 17, bifurcated at its inner portion thereby providing two apertured legs or parts 18 rotatably mounted on the pin 16, each alternate pawl accommodating between its parts 18 a coiled spring 19, which encircles the rod 16 and has its two ends 20 and 21 extended so as to co-act with two of the pawls on the same side of the disk and thrust the same outwardly, as will be readily understood from a consideration of the construction shown in Figs. 1 and 2. All of these pawls project in the same direction from their supporting pins or rods 16, so that the pawls in the rear of Fig. 1 do not appear but are shown in Fig. 4, which is a section omitting the nearer group of pawls.

Rotatably mounted on the hub 13 of disk 12 on the opposite sides of such disk is a pair of hollow cases 22 and 23, each having a central hub portion 24, the two cases being fitted together so that their hollow parts register to form a single cavity for the accommodation of the disk 12 and the pawls which it carries. Each of these cases on the inner face of its outer substantially-cylindrical wall is equipped with a plurality of notches and teeth 25, which makes each case an independent ratchet, the notches and teeth being so spaced that only one of the pawls 17 operatively engages therewith at a time, the other pawls varying different amounts from engagement with the teeth so that at any time an operative connection can be secured between the disk and the case with but a slight turning of one of the parts. The case 23 has on its outer surface, a gear segment 26, the teeth of which mesh with those of a gear segment 27, keyed to a rocker shaft 28. This segment 27 also has integral therewith, another segment 29, the teeth of which co-act with another gear segment 30, fixed on another rocker shaft 31. This latter segment 30 in turn has integral therewith, another segment 32, the teeth of which are in mesh with similar teeth 33 on the outer face of casing 22. Shaft 31 has loosely mounted thereon a worm wheel 34 carrying a stop-lug 35 in the path of travel of the segment 30. Meshing with the worm wheel 34, I employ a worm 36 fastened to a shaft 37, which may be turned by a handle 38 fixed thereto, the position of the handle being shown on an indicator 39, which is no part of the present invention but is the invention of another person.

The mechanism above described is inclosed in a stationary housing 40 having an aperture 41 for the accommodation of shaft 10, such housing providing bearings for the shafts 28 and 31 and the worm shaft 37. The shaft 31 projects out of the casing at one end and has fixed to such apertured end by a key 41ª, a member 42 with a pair of extended ears 43, 43, straddling an operating handle 44 fulcrumed on the member 42 at 45. Between these ears 43 and the handle I interpose a pair of coiled springs 46, bearing on opposite sides of the handle and which may be adjusted by the screws 47 bearing against the washers or other members 48.

In a depending arm 49 of the housing 40, I rockingly mount a shaft 50 and fix to one end thereof, an upwardly extending pawl-release and brake handle 51, the other end of such shaft 50, at the opposite side of its bearing 52 having fixed thereto a rock lever 53 extended in opposite directions from the shaft 50. One end of such lever is connected by a bent link 54 and an attachment piece 55, to one end of a metallic band 56 encircling the enlarged portion 14 of the disk and those parts of both sets of pawls overlapping such part of the disk. As shown in Fig. 4, this attachment piece 55 extends through a narrow slot of a portion of the metallic band 56, the other end of the latter being supplied with a similar anchor or securing member 57, which is operatively connected to the other end of the lever 53 by a comparatively short link 58. In order to permit these members 55 and 57 to be connected to the band 56 and also project outside of the pair of ratchet cases 22 and 23, the latter are cut away at 59 around a portion of their circumference to provide a curved slot or opening for this purpose. The casing or housing 40, as shown in Figs. 1 and 4, is supplied with an adjustable screw stop 60 against which the gear segment 27 normally bears.

The operation of this form and style of mechanism is substantially as follows: Assuming that the handle 38 has been turned to the proper position for the desired cut, it being apparent that this turning of the handle revolves the worm 36, worm wheel 34 and stop 35 to the proper adjusted position, whenever it is desired to shift the knees of the set works toward the saw which amount is indicated on the scale 39, the operator grasps the cushioned handle 44 and swings it from the position marked A in Fig. 1, to the position marked B and then back again to A. During the movement of such handle from A to B, shaft 31 is moved in a clockwise direction until the gear segment 30 strikes the adjustable stop 35. This limits the movement of the handle 44 and corresponds to the position marked B. During such turning of shaft 31, gear segment 32 by meshing with the teeth 33 revolves case 22 in a counter-clockwise direction, such movement of the case being transmitted to the shaft 10 through one of the ratchet teeth 25 and one of the pawls 17, the others being inoperative. Also during this turning of the shaft 31, owing to the inter-meshing of segments 30 and 29 and 27 and 26, casing 23 is revolved in a clockwise direction and during such turning of the case the ratchet teeth 25 of the latter pass idly over the corresponding set of pawls 17, owing to the inclination of the latter. When the handle is swung back from B to A, case 22 is turned idly clockwise and case 23 is turned in a counter-clockwise direction, further revolving the shaft 10 in the same direction owing to the coöperation between the teeth 25 and one of the pawls 17, this movement continuing until the segment 27 strikes the fixed adjustable stop 60. Clearly then, the limit of turning shaft 31 and the handle 44 is determined by two stops 60 and 35, the former being stationary while the latter is readily adjustable by the handle 38. During both the forward and backward movement of the handle 44, the shaft 10 is moved given amounts in the same direction. In other words, it is a simple and effective double acting set works.

After the knees have been fed toward the saw at intervals as explained above, and it is desired to secure their retraction by means not shown, it is necessary to free the shaft 10 from the double acting mechanism described and this is accomplished by swinging the pawl-releasing handle in the direction indicated by the arrow in Fig. 1. Such movement of the handle, as will be readily understood, causes a contraction of the metal band 56 on all the pawls, retracting all of the latter away from the two ratchets of the pair of cases 22 and 23. When the pawls are thus withdrawn, the knees may be moved back by any suitable mechanism not shown and in order to stop the movement of the parts quickly when they reach the desired limit of backward travel, this is accomplished by still further moving the handle to the right which contracts the band 56 further so as to act as a friction brake on the cylindrical surface of the disk 12, the pawls under such circumstances being accommodated in the recesses 15, as shown in Fig. 4. When the parts have been stopped by this braking mechanism, the handle 51 is released, the band 56 expands, and all of the pawls turn outwardly into engagement with the two ratchets, ready for a repetition of the action of the double acting set works mechanism described.

The device described in this application and shown in the accompanying drawings represents but a single embodiment of this invention which is capable of embodiments in several different forms and styles of mechanism, so that I wish to have it understood that the invention is not limited and restricted to the precise and exact structural features of this particular mechanism, since they may be varied within comparatively wide limits without departing from the substance of the invention.

I claim:

1. The combination of a shaft, double acting means to turn said shaft including a ratchet, a disk, a pawl carried by said disk and arranged to engage the ratchet, a contractible band surrounding said disk and pawl, and means to contract said band whereby to render said pawl inoperative and to apply a braking friction to such disk, substantially as described.

2. The combination of a shaft, a disk fixed to said shaft, a double acting means coöperating with said disk and adapted to turn said shaft, including a plurality of pawls mounted on said disk, and a ratchet arranged to be engaged by the pawls, a contractible band coöperating with said pawls and disk, and means to contract said band to render said pawls inoperative and to cause said band to act as a brake on said disk, substantially as described.

3. The combination with a shaft, of a disk on said shaft, a series of pawls arranged around said disk, a ratchet ring surrounding said pawls, yielding means to normally hold the pawls in engagement with the ratchet, means for oscillating said ring, a band surrounding said pawls, and means for drawing said band in upon said pawls, whereby said band may be made to retract the pawls out of engagement with said ring and exert braking pressure on said disk.

4. The combination with a shaft, of a disk on said shaft, two sets of pawls carried by said disk, a ratchet ring co-acting with each set of pawls, yielding means to normally hold the pawls in engagement with the ratchet means for oscillating said ratchet rings in opposite directions, a band encircling said disk and pawls, and means for tightening said band upon said disk, whereby the band may release said pawls and act as a brake upon said disk.

5. The combination with a shaft, of a disk on said shaft, two sets of pawls carried by said disk, a pair of ratchet members arranged to be oscillated about said disk and engage said pawls, gear teeth on each of said ratchet members, a pair of oscillating members having teeth meshing with those on the said ratchet members, and gearing connecting said oscillatory members together so that they will drive said ratchet members in opposite directions.

6. The combination, with a shaft, of a brake disk on said shaft, a series of pawls arranged around the disk, an interiorly facing ratchet ring surrounding the pawls, means to yieldingly press the pawls radially beyond the disk into engagement with the teeth of the ratchet ring, a contractible brake band encircling the pawls, means to contract the band to press the pawls inwardly out of engagement with the ratchet and to bring the band into frictional engagement with the brake disk, substantially as described.

IRA M. THURLOW.

Witnesses:
F. A. HORSTMANN,
TILLA SOLIEN.

---

Copies of this patent may be obtained for five cents each, by addressing the "Commissioner of Patents, Washington, D. C."